(12) United States Patent
Gotou et al.

(10) Patent No.: US 12,164,287 B2
(45) Date of Patent: Dec. 10, 2024

(54) CONTROL APPARATUS, CONTROL METHOD AND RECORDING MEDIUM HAVING RECORDED THEREON CONTROL PROGRAM

(71) Applicant: Yokogawa Electric Corporation, Tokyo (JP)

(72) Inventors: Hirotsugu Gotou, Tokyo (JP); Hiroaki Kanokogi, Tokyo (JP); Yota Furukawa, Tokyo (JP); Keiichiro Kobuchi, Tokyo (JP); Mizuo Kawahara, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 268 days.

(21) Appl. No.: 17/676,203

(22) Filed: Feb. 20, 2022

(65) Prior Publication Data

US 2022/0291671 A1    Sep. 15, 2022

(30) Foreign Application Priority Data

Mar. 9, 2021   (JP) .................. 2021-037331

(51) Int. Cl.
   *G05B 19/418*   (2006.01)
   *G06N 20/00*   (2019.01)
(52) U.S. Cl.
   CPC .................. *G05B 19/41885* (2013.01); *G05B 19/41825* (2013.01); *G06N 20/00* (2019.01); *G05B 2219/36252* (2013.01)
(58) Field of Classification Search
   None
   See application file for complete search history.

(56) References Cited

U.S. PATENT DOCUMENTS

| | | |
|---|---|---|
| 2017/0285584 A1 | 10/2017 | Nakagawa |
| 2018/0354125 A1 | 12/2018 | Ueda |
| 2019/0137969 A1 | 5/2019 | Watanabe |
| 2019/0346836 A1 | 11/2019 | Ando |
| 2020/0026246 A1 | 1/2020 | Nakagawa |
| 2020/0057416 A1 | 2/2020 | Matsubara |
| 2020/0192340 A1 | 6/2020 | Gooch |

(Continued)

FOREIGN PATENT DOCUMENTS

| | | |
|---|---|---|
| CN | 102053211 A | 5/2011 |
| EP | 3291035 A1 | 3/2018 |
| JP | S61279904 A | 12/1986 |

(Continued)

OTHER PUBLICATIONS

Office Action issued for counterpart Japanese Application No. 2021-037331, issued by the Japanese Patent Office on May 9, 2023 (drafted on Apr. 25, 2023).

(Continued)

*Primary Examiner* — Ryan A Jarrett

(57) ABSTRACT

Provided is a control apparatus comprising a control unit configured to control a control target by a control model machine-learned so as to output an operation amount of the control target according to a state of equipment provided with the control target; a simulation unit configured to simulate, by using a simulation model, the state of the equipment in a case where the operation amount, which is output by the control model, is given to the control target; and a stop unit configured to stop control of the control target by the control model, based on a simulation result.

19 Claims, 9 Drawing Sheets

(56) References Cited

U.S. PATENT DOCUMENTS

| | | |
|---|---|---|
| 2020/0233316 A1 | 7/2020 | Asano |
| 2022/0326661 A1 | 10/2022 | Idesawa |

FOREIGN PATENT DOCUMENTS

| | | |
|---|---|---|
| JP | 2001254111 A | 9/2001 |
| JP | 2003044102 A | 2/2003 |
| JP | 2011059873 A | 3/2011 |
| JP | 2018202564 A | 12/2018 |
| JP | 2019071405 A | 5/2019 |
| JP | 2019086928 A | 6/2019 |
| JP | 2019200453 A | 11/2019 |
| JP | 2020027556 A | 2/2020 |
| JP | 6813231 B1 | 1/2021 |

OTHER PUBLICATIONS

Office Action issued for counterpart Japanese Application No. 2021-037331, issued by the Japanese Patent Office on Feb. 21, 2023 (drafted on Feb. 14, 2023).

Extended European Search Report for counterpart European Application No. 22158404.8, issued by the European Patent Office on Jul. 6, 2022.

Office Action issued for counterpart Chinese Application 202210186340.2, issued by the State Intellectual Property Office of People's Republic of China on Oct. 10, 2024.

CONTROL APPARATUS, CONTROL METHOD AND RECORDING MEDIUM HAVING RECORDED THEREON CONTROL PROGRAM

The contents of the following Japanese patent application(s) are incorporated herein by reference:
NO. 2021-037331 filed in JP on Mar. 9, 2021.

BACKGROUND

1. Technical Field

The present invention relates to a control apparatus, a control method and a recording medium having recorded thereon a control program.

2. Related Art

Patent Document 1 discloses 'performs the machine learning of a compensation amount of a teaching position of a robot with respect to a disturbance produced in a motor that drives each joint of the robot, and compensates and controls the teaching position so as to reduce the disturbance when the robot moves to the teaching position, based on a result of the machine learning'.

CITATION LIST

Patent Document

Patent Document 1: Japanese Patent Application Publication No. 2018-202564

SUMMARY (Item 1)
A first aspect of the present invention provides a control apparatus. The control apparatus may comprise a control unit configured to control a control target by a control model machine-learned so as to output an operation amount of the control target according to a state of equipment provided with the control target. The control apparatus may comprise a simulation unit configured to simulate, by using a simulation model, the state of the equipment in a case where the operation amount, which is output by the control model, is given to the control target. The control apparatus may comprise a stop unit configured to stop the control of the control target by the control model, based on a simulation result.

(Item 2)
The stop unit may be configured to stop the control of the control target by the control model when the simulation result indicates occurrence of an abnormality in the equipment.

(Item 3)
The control apparatus may further comprise an output unit configured to output the simulation result. The stop unit may be configured to stop the control of the control target by the control model when the stop unit acquires an instruction to stop the control in response to the output of the simulation result.

(Item 4)
The control apparatus may further comprise a frequency adjustment unit configured to adjust a frequency of simulating the state of the equipment.

(Item 5)
The frequency adjustment unit may be configured to reduce the frequency of simulation as an elapsed time since the control of the control target by the control model is started becomes longer.

(Item 6)
The control apparatus may further comprise a switching unit configured to switch whether to input or shut off an output by the control model with respect to the control target. The stop unit may be configured to shut off the switching unit when stopping the control of the control target by the control model.

(Item 7)
The switching unit may be configured by a physical switch.

(Item 8)
The control apparatus may further comprise an instruction unit configured to instruct the control target to switch to control by another control means when stopping the control of the control target by the control model.

(Item 9)
The simulation model may be a simple model capable of simulating the state of the equipment in a shorter time than a time spent on an actual operation of the equipment.

(Item 10)
The control apparatus may further comprise a state data acquisition unit configured to acquire state data indicative of the state of the equipment. The control apparatus may further comprise an operation amount data acquisition unit configured to acquire operation amount data indicative of the operation amount. The control apparatus may further comprise a control model generation unit configured to generate the control model by machine learning by using the state data and the operation amount data.

(Item 11)
The control model generation unit may be configured to generate the control model by performing reinforcement learning so that an operation amount whose reward value determined by a predetermined reward function is higher is output as a more recommended operation amount, in response to an input of the state data.

(Item 12)
A second aspect of the present invention provides a control method. The control method may comprise controlling a control target by a control model machine-learned so as to output an operation amount of the control target according to a state of equipment provided with the control target. The control method may comprise simulating, by using a simulation model, the state of the equipment in a case where an operation amount, which is output by the control model, is given to the control target. The control method may comprise stopping the control of the control target by the control model, based on a simulation result.

(Item 13)
A third aspect of the present invention provides a recording medium having recorded thereon a control program. The control program may be configured to be executed by a computer. The control program may be configured to cause the computer to function as a control unit configured to control a control target by a control model machine-learned so as to output an operation amount of the control target according to a state of equipment provided with the control target. The control program may be configured to cause the computer to function as a simulation unit configured to simulate, by using a simulation model, the state of the equipment in a case where the operation amount, which is output by the control model, is given to the control target.

The control program may be configured to cause the computer to function as a stop unit configured to stop the control of the control target by the control model, based on a simulation result.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments are essential to the solution of the invention.

Figure 1:
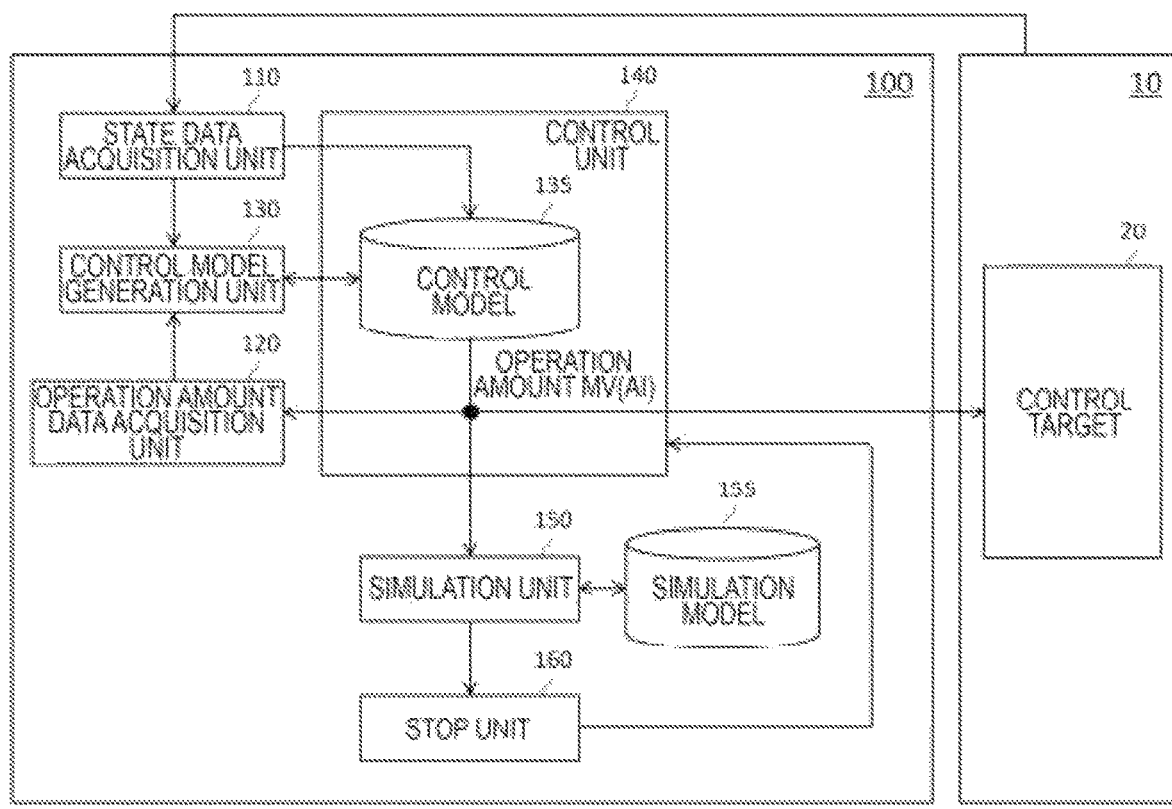
FIG. 1 shows an example of a block diagram of a control apparatus 100 according to the present embodiment, together with equipment 10 provided with a control target 20.

FIG. 1 shows an example of a block diagram of a control apparatus 100 according to the present embodiment, together with equipment 10 provided with a control target 20. The control apparatus 100 according to the present embodiment is configured, during control (also referred to as artificial intelligence (AI) control) of the control target 20 by a learning model generated by machine learning, to simulate a state of the equipment 10 in a case where an output of the learning model is given to the control target 20. The control apparatus 100 according to the present embodiment is configured to stop the AI control based on a simulation result.

The equipment 10 is a facility, an apparatus, or the like provided with the control target 20. For example, the equipment 10 may be a plant or a complex apparatus in which a plurality of devices is combined. Examples of the plant may include a plant for managing and controlling well sites such as a gas field and an oil field and surroundings thereof, a plant for managing and controlling power generations such as hydroelectric, thermo electric, and nuclear power generations, a plant for managing and controlling environmental power generation such as solar power and wind power, a plant for managing and controlling water and sewerage, a dam and the like, and the like, in addition to industrial plants such as chemical and bio industrial plants.

The equipment 10 is provided with the control target 20. In the present drawing, a case where the equipment 10 is provided with only one control target 20 is shown as an example, but the present invention is not limited thereto. The equipment 10 may be provided with a plurality of control targets 20.

In addition, the equipment 10 may be provided with one or more sensors (not shown) configured to measure a variety of states (physical quantities) inside and outside the equipment 10. Such sensors are configured to measure, for example, operation data, consumption data, external environment data, and the like.

Here, the operation data indicates an operation state as a result of controlling the control target 20. For example, the operation data may indicate a measured value PV (Process Variable) measured for the control target 20, and as an example, may indicate an output (control amount) of the control target 20, or a variety of values that are changed by an output of the control target 20.

The consumption data indicates an amount of consumption of at least one of energy or raw material in the equipment 10. For example, the consumption data may indicate an amount of consumption of electric power or fuel (as an example, LPG: Liquefied Petroleum Gas), as energy consumption.

The external environment data indicates a physical quantity that can act as a disturbance with respect to control of the control target 20. For example, the external environment data may indicate a temperature and a humidity of an outside air of the equipment 10, a sunshine, a wind direction, an air volume, an amount of precipitation, and various physical quantities that change with control of other devices provided to the equipment 10.

The control target 20 is a device, an apparatus or the like that is a target of control. For example, the control target 20 may be an actuator such as a valve, a pump, a heater, a fan, a motor and a switch that is configured to control at least one physical quantity such as a pressure, a temperature, a pH, a speed or a flow rate in a process of the equipment 10, and is configured to input a given operation amount MV (Manipulated Variable) and to output a control amount.

The control apparatus 100 according to the present embodiment is configured, during control (AI control) of the control target 20 by a learning model generated by machine learning, to simulate a state of the equipment 10 in a case where an output of the learning model is given to the control target 20. The control apparatus 100 according to the present embodiment is configured to stop the AI control based on a simulation result.

The control apparatus 100 may be a computer such as a PC (personal computer), a tablet-type computer, a smart phone, a workstation, a server computer or a general-purpose computer, or a computer system where a plurality of computers is connected. Such computer system is also a computer in a broad sense. In addition, the control apparatus 100 may also be implemented by one or more virtual computer environments that can be executed in the computer. Instead of this, the control apparatus 100 may also be a dedicated computer designed for AI control or dedicated hardware implemented by dedicated circuitry. Further, in a case where the control apparatus 100 can connect to the Internet, the control apparatus 100 may also be implemented by cloud computing.

The control apparatus 100 comprises a state data acquisition unit 110, an operation amount data acquisition unit 120, a control model generation unit 130, a control model 135, a control unit 140, a simulation unit 150, a simulation model 155, and a stop unit 160. Note that, these blocks are functional blocks that are each functionally divided, and are not necessarily required to be matched with actual device configurations. That is, one block shown in the present drawing is not necessarily required to be configured by one device. In addition, separate blocks shown in the present drawing are not necessarily required to be configured by separate devices.

The state data acquisition unit 110 is configured to acquire state data indicative of a state of the equipment 10 provided with the control target 20. For example, the state data acquisition unit 110 is configured to acquire operation data, consumption data, external environment data and the like measured by sensors provided to the equipment 10 from the sensors via a network, as the state data. However, the present invention is not limited thereto. The state data acquisition unit 110 may also be configured to acquire such state data from an operator, or to acquire such state data from various memory devices and the like. The state data acquisition unit 110 is configured to supply the acquired state data to the control model generation unit 130 and the control model 135.

The operation amount data acquisition unit 120 is configured to acquire operation amount data indicative of an operation amount of the control target 20. For example, the operation amount data acquisition unit 120 is configured to acquire data, which indicates an operation amount MV (AI) that is output by the control model 135 when AI-controlling the control target 20, from the control unit 140, as the operation amount data. However, the present invention is not limited thereto. The operation amount data acquisition unit 120 may also be configured to acquire such operation amount data from an operator, or to acquire such operation amount data from various memory devices. The operation amount data acquisition unit 120 is configured to supply the acquired operation amount data to the control model generation unit 130.

Note that, in the present drawing, a case where the operation amount data acquisition unit 120 acquires, as the operation amount data, data indicative of the operation amount MV (AI) output by the control model 135 is shown as an example. However, the present invention is not limited thereto. When the control apparatus 100 performs machine-learning of a model by using, as learning data, data under control of the control target 20 by a further controller (not shown), the operation amount data acquisition unit 120 may be configured to acquire, as the operation amount data, data indicative of an operation amount given to the control target 20 from the further controller. As an example, when the control of the control target 20 can switch between feedback control by an operation amount MV (FB: FeedBack) given from a further controller and AI control by an operation amount MV (AI) given from the control model 135, the operation amount data acquisition unit 120 may also be configured to acquire data indicating the operation amount MV (FB) given to the control target 20 from the further controller, as the operation amount data. Note that, such FB control may be control using at least one of proportional control (P control), integral control (I control) or differential control (D control), for example, and may be, as an example, PID control. In addition, such further controller may also be integrally configured as a part of the control apparatus 100 according to the present embodiment, or may also be configured as a separate body independent of the control apparatus 100.

The control model generation unit 130 is configured to generate a control model 135, which outputs an operation amount corresponding to a state of the equipment 10, by machine learning by using the state data and the operation amount data. For example, the control model generation unit 130 is configured to generate a control model 135, which outputs the operation amount MV (AI) corresponding to a state of the equipment 10, by reinforcement-learning, as learning data, the state data supplied from the state data acquisition unit 110 and the data indicative of the operation amount MV (AI) supplied from the operation amount data acquisition unit 120. That is, the control model generation unit 130 is configured to generate the control model 135 by performing reinforcement learning so that an operation amount whose reward value determined by a predetermined reward function is higher is output as a more recommended operation amount, in response to an input of the state data. This will be described later in detail.

The control model 135 is a learning model generated as a result of the reinforcement learning by the control model generation unit 130, and is configured to output the operation amount MV (AI) corresponding to the state of the equipment 10. For example, the control model 135 is configured to input the state data supplied from the state data acquisition unit 110 and to output a recommended operation amount MV (AI) that is to be given to the control target 20 according to the state of the equipment 10. Note that, in the present drawing, a case where the control model 135 is built in the control apparatus 100 is shown as an example. However, the present invention is not limited thereto. The control model 135 may also be stored in an apparatus (for example, on a cloud server) different from the control apparatus 100. Similarly, the control model generation unit 130 may also be provided to an apparatus different from the control apparatus 100.

The control unit 140 is configured to supply the operation amount MV (AI) output by the control model 135 to the control target 20. Thereby, the control unit 140 is configured to control the control target 20 by the control model 135 machine-learned so as to output the operation amount of the control target 20 according to the state of the equipment 10 provided with the control target 20. In addition, the control unit 140 is configured to supply the operation amount MV (AI) output by the control model 135 to the simulation unit 150 and the operation amount data acquisition unit 120.

The simulation unit 150 is configured, by using the simulation model 155, to simulate the state of the equipment 10 in a case where the operation amount MV (AI) output by the control model 135 is given to the control target 20. Note that, as used herein, 'simulating' includes a case where the simulation unit 150 causes another apparatus (for example, a simulator (not shown)) to simulate a state of the equipment 10 and acquires the state of the equipment 10 simulated by another apparatus from another apparatus, in addition to a case where the simulation unit 150 plays a central role in simulating the state of the equipment 10 by itself. For example, the simulation unit 150 is configured to input, to the simulation model 155, the operation amount MV (AI)

output by the control model 135, and to acquire a plurality of output values output by the simulation model 155, as a simulation result. The simulation unit 150 is configured to supply the acquired simulation result to the stop unit 160.

The simulation model 155 is a model (for example, a plant model) constructed so as to simulate a behavior of the equipment 10. For example, the simulation model 155 is configured to simulate a behavior of the equipment 10 in a case where the operation amount MV (AI) is input and the operation amount MV (AI) is given to the control target 20. Then, the simulation model 155 is configured to output a plurality of output values indicative of the simulated state of the equipment 10. As an example, the simulation model 155 may be a simple model capable of simulating a state of the equipment 10 in a shorter time than a time spent on an actual operation of the equipment 10, for example, a simple physical model having a relatively light processing load or a relatively low-order linear model. Note that, in the present drawing, a case where the simulation model 155 is built in the control apparatus 100 is shown as an example. However, the present invention is not limited thereto. Similar to the control model 135, the simulation model 155 may also be stored in an apparatus (for example, on a cloud server) different from the control apparatus 100. In addition, the above-described simulator may also be provided to an apparatus different from the control apparatus 100.

The stop unit 160 is configured to stop the control of the control target 20 by the control model 135, based on the simulation result. For example, the stop unit 160 is configured to determine whether the simulation result supplied from the simulation unit 150 satisfies a predetermined condition (for example, an abnormality diagnosis condition). When the simulation result indicates occurrence of an abnormality in the equipment 10, the stop unit 160 is configured to notify the control unit 140 to that effect. In response to this, the control unit 140 is configured to stop the supply of the operation amount MV (AI) output by the control model 135 to the control target 20. In this way, the stop unit 160 is configured to stop the control of the control target 20 by the control model 135 when the simulation result indicates the occurrence of an abnormality in the equipment 10 (for example, when it is expected that an abnormality will occur in the equipment 10 within a few days).

Figure 2:
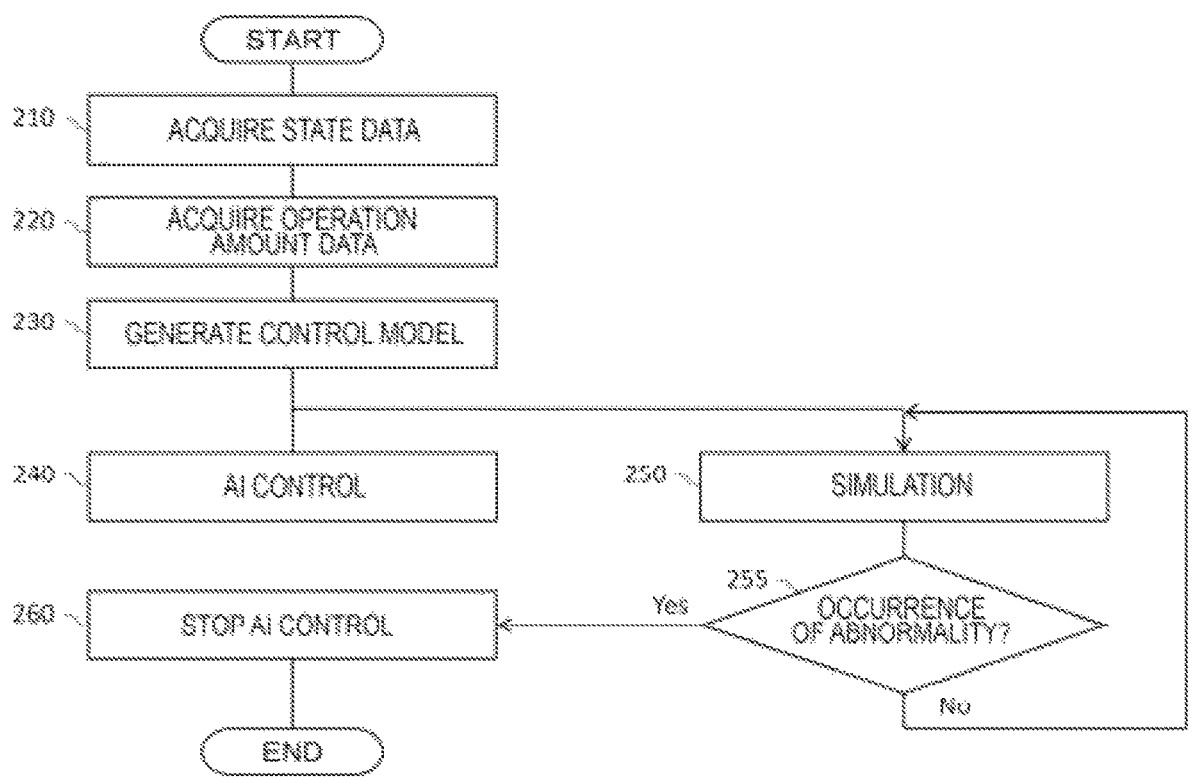
FIG. 2 shows an example of a flow where the control apparatus 100 according to the present embodiment stops AI control.

FIG. 2 shows an example of a flow where the control apparatus 100 according to the present embodiment stops AI control.

In step 210, the control apparatus 100 acquires state data. For example, the state data acquisition unit 110 acquires state data indicative of a state of the equipment 10 provided with the control target 20. As an example, the state data acquisition unit 110 acquires operation data, consumption data, external environment data and the like measured by the sensors provided to the equipment 10 from the sensors via a network, as the state data. The state data acquisition unit 110 is configured to supply the acquired state data to the control model generation unit 130 and the control model 135.

In step 220, the control apparatus 100 acquires operation amount data. For example, the operation amount data acquisition unit 120 acquires operation amount data indicative of an operation amount of the control target 20. As an example, the operation amount data acquisition unit 120 acquires data, which indicates an operation amount MV (AI) that is output by the control model 135 when AI-controlling the control target 20, from the control unit 140, as the operation amount data. The operation amount data acquisition unit 120 is configured to supply the acquired operation amount data to the control model generation unit 130. Note that, in the present drawing, a case where the control apparatus 100 acquires the operation amount data after acquiring the state data is shown as an example. However, the present invention is not limited thereto. The control apparatus 100 may also acquire the state data after acquiring the operation amount data or may also acquire the state data and the operation amount data at the same time.

In step 230, the control apparatus 100 generates the control model 135. For example, the control model generation unit 130 generates the control model 135, which outputs an operation amount corresponding to a state of the equipment 10, by machine learning by using the state data and the operation amount data. As an example, the control model generation unit 130 generates the control model 135, which outputs the operation amount MV (AI) corresponding to a state of the equipment 10, by reinforcement-learning, as learning data, the state data acquired in step 210 and the data indicative of the operation amount MV (AI) acquired in step 220.

In general, when an agent observes a state of an environment and selects a certain action, the environment changes based on the action. In reinforcement learning, a certain reward is given in association with such change in environment, so that the agent learns selection of a better action (decision-making). In supervised learning, a complete correct answer is given, whereas in reinforcement learning, a reward is given as a fragmentary value based on change in a part of the environment. For this reason, the agent learns so as to select an action that maximizes a total reward in the future. In this way, in reinforcement learning, the agent learns an appropriate action, considering an interaction that an action has on the environment by learning the action, i.e., an action for maximizing a reward that will be obtained in the future.

In the present embodiment, the reward in such reinforcement learning may be an index for evaluating an operation of the equipment 10 or may be a value determined by a predetermined reward function. As used herein, the function is a mapping having a rule of correlating each element of a certain set and each element of another set on one-to-one correspondence, and may be, for example, a mathematical formula or a table.

The reward function outputs a value (reward value) obtained as a result of evaluating the state of the equipment 10 indicated by the state data, in response to the input of the state data. As described above, for example, the state data includes the measured value PV measured for the control target 20. Therefore, the reward function may be defined as a function in which the reward value becomes higher as the measured value PV is closer to a target value SV (Setting Variable). Here, a function whose variable is an absolute value of a difference between the measured value PV and the target value SV is defined as an evaluation function. That is, as an example, in a case where the control target 20 is a valve, the evaluation function may be a function whose variable is an absolute value of a difference between the measured value PV, which is an opening degree of the valve actually measured by a sensor, and the target value SV, which is a target opening degree of the valve. The reward function may be a function whose variable is a value of the evaluation function obtained by such evaluation function.

Further, as described above, the state data includes, for example, various values that change depending on an output of the control target 20, consumption data, external environment data, and the like, in addition to the measured value PV Therefore, the reward function may be a function that increases or decreases the reward value based on such various values, consumption data, external environment data, and the like. As an example, in a case where there are constraints that should be observed with respect to such various values and consumption data, the reward function may be a function that minimizes the reward value, if such various values and consumption data do not satisfy constraint conditions, in light of the external environment data. Further, in a case where there are targets that are to be aimed with respect to such various values and consumption data, the reward function may be a function that increases the reward value as such various values and consumption data are closer to the targets and decreases the reward value as such various values and consumption data are farther from the targets, in light of the external environment data.

The control model generation unit 130 acquires the reward value in each learning data, based on such reward function. Then, the control model generation unit 130 performs reinforcement learning by using each set of learning data and reward value. At this time, the control model generation unit 130 may perform learning processing by a known method such as a steepest descent method, a neural network, a DQN (Deep Q-Network), a Gaussian process and deep learning. Then, the control model generation unit 130 learns so that an operation amount whose reward value is higher is preferentially output as a more recommended operation amount. That is, the control model generation unit 130 is configured to generate the control model 135 by performing reinforcement learning so that an operation amount whose reward value determined by a predetermined reward function is higher is output as a more recommended operation amount, in response to an input of the state data. Thereby, the model is updated and the control model 135 is generated.

In step 240, the control apparatus 100 AI-controls the control target 20. For example, by supplying the operation amount MV (AI) output by the control model 135 to the control target 20, the control unit 140 controls the control target 20 by the control model 135 machine-learned so as to output the operation amount of the control target 20 according to the state of the equipment 10 provided with the control target 20. Further, in parallel with this, the control unit 140 supplies the operation amount MV (AI) output by the control model 135 to the simulation unit 150.

In step 250, the control apparatus 100 executes simulation. For example, the simulation unit 150, by using the simulation model 155, simulates a state of the equipment 10 in a case where the operation amount MV (AI) output by the control model 135 is given to the control target 20. As an example, the simulation unit 150 inputs, to the simulation model 155, the operation amount MV (AI) output by the control model 135 generated in step 230, and acquires a plurality of output values output by the simulation model 155, as a simulation result. In this way, in parallel with the AI control, the control apparatus 100 simulates the state of the equipment 10 in a case where the operation amount MV (AI) output by the control model 135 is given to the control target 20. The simulation unit 150 is configured to supply the acquired simulation result to the stop unit 160.

In step 255, the control apparatus 100 determines presence or absence of occurrence of an abnormality in the equipment 10. For example, the stop unit 160 may store in advance an abnormality diagnosis condition for diagnosing an abnormality in the equipment 10. When all of the plurality of output values output by the simulation model 155 do not satisfy the abnormality diagnosis condition, the stop unit 160 may infer that no abnormality occurs in the equipment 10. In addition, when at least one of the plurality of output values output by the simulation model 155 satisfies the abnormality diagnosis condition, the stop unit 160 may infer that an abnormality occurs in the equipment 10.

When the simulation result does not indicate occurrence of an abnormality in the equipment 10 in step 255 (in a case of No), the control apparatus 100 returns the processing to step 250 and continues the flow. Note that, in this case, the AI control in step 240 continues.

When the simulation result indicates occurrence of an abnormality in the equipment 10 in step 255 (in a case of Yes), the control apparatus 100 advances the processing to step 260.

In step 260, the control apparatus 100 stops the AI control. For example, the stop unit 160 stops the control of the control target 20 by the control model 135, based on the simulation result. As an example, when the simulation result indicates occurrence of an abnormality in the equipment 10, the stop unit 160 notifies the control unit 140 to that effect. In response to this, the control unit 140 is configured to stop the supply of the operation amount MV (AI) output by the control model 135 to the control target 20. In this way, the stop unit 160 stops the control of the control target 20 by the control model 135 when the simulation result indicates the occurrence of an abnormality in the equipment 10.

In general, machine learning uses input data to determine a parameter of a learning model, which is stochastically obtained and is not theoretically guaranteed. For this reason, abnormal inference data may be output from the learning model. Therefore, the control apparatus 100 according to the present embodiment simulates, by using the simulation model 155, the state of the equipment 10 in a case where the operation amount MV (AI) output by the control model 135 is given to the control target 20, in parallel with the AI control of the control target 20. Then, the control apparatus 100 stops the AI control, based on the simulation result. Thereby, according to the control apparatus 100 of the present embodiment, when it is inferred that the equipment 10 behaves abnormally with the AI control, the AI control can be stopped. Here, it may also be considered to determine whether to stop the AI control, based on whether the operation amount MV (AI) output by the control model 135 satisfies a predetermined standard. However, such standard is given artificially and empirically, and, it cannot be said that even if the operation amount MV (AI) satisfies such standard, an abnormality always does not occur in the equipment 10. Similarly, it cannot be said that even if the operation amount MV (AI) does not satisfy such standard, an abnormality always occurs in the equipment 10. In contrast, according to the control apparatus 100 of the present embodiment, the stop of the AI control is determined, based on the result of simulating the state of the equipment 10 in a case where the operation amount MV (AI) is given to the control target 20, not based on the operation amount MV (AI) itself. Therefore, it is possible to determine the stop of the AI control, based on a basis closer to the actual operation.

Further, in the control apparatus 100 according to the present embodiment, the simulation model 155 used for simulation may be a simple model, as compared to the actual equipment 10. Thereby, according to the control apparatus 100 of the present embodiment, since the state of the equipment 10 can be simulated in a shorter time than a time spent on an actual operation of the equipment 10, the AI control can be stopped prior to occurrence of an abnormality in the actual equipment 10.

Figure 3:
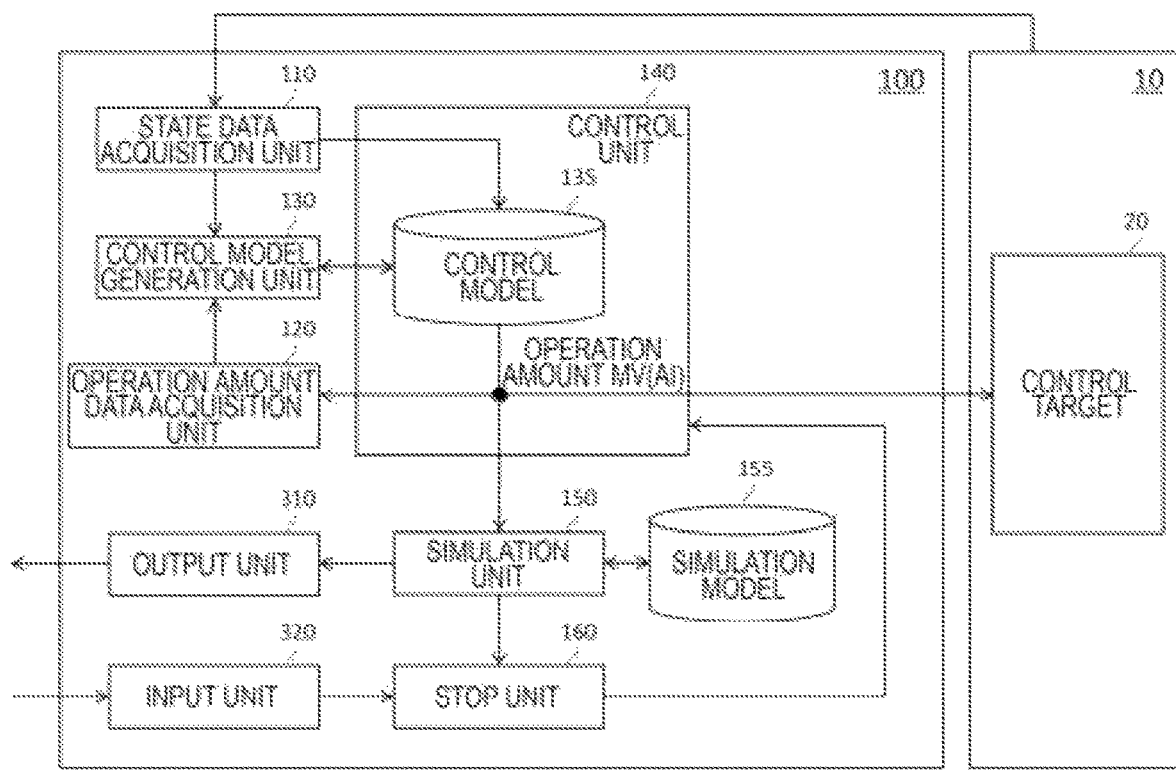
FIG. 3 shows an example of a block diagram of the control apparatus 100 according to a first modified embodiment of the present embodiment, together with the equipment 10 provided with the control target 20.

FIG. 3 shows an example of a block diagram of the control apparatus 100 according to a first modified embodiment of the present embodiment, together with the equipment 10 provided with the control target 20. In FIG. 3, the members having same functions and configurations as those in FIG. 1 are denoted with the same reference signs, and descriptions thereof are omitted, except differences to be described below. In the control apparatus 100 according to the above-described embodiment, the case where the stop of AI control is automatically determined based on the simulation result has been shown as an example. However, in the control apparatus 100 according to the first modified embodiment, the simulation result is output, and the AI control is stopped based on an instruction from an operator or the like who has examined the simulation result. The control apparatus 100 according to the first modified embodiment further comprises an output unit 310 and an input unit 320.

In the control apparatus 100 according to the present modified embodiment, the simulation unit 150 is configured to supply a simulation result to the output unit 310, in addition to the stop unit 160. The output unit 310 is configured to output the simulation result. For example, the output unit 310 may also be configured to output the simulation result by displaying the same on a monitor, to output the simulation result by printing the same out, or to output the simulation result by data-transmitting the same to another apparatus.

The input unit 320 is configured to receive a user input from an operator or the like who has examined the simulation result, in response to the output of the simulation result. The input unit 320 is configured to supply, to the stop unit 160, a user-input instruction from the operator.

The stop unit 160 is configured to determine to stop the AI control when the instruction supplied from the input unit 320 indicates that the AI control is to be stopped. That is, the stop unit 160 is configured to stop the control of the control target 20 by the control model 135 when the stop unit acquires an instruction to stop the control in response to the output of the simulation result.

Figure 4:
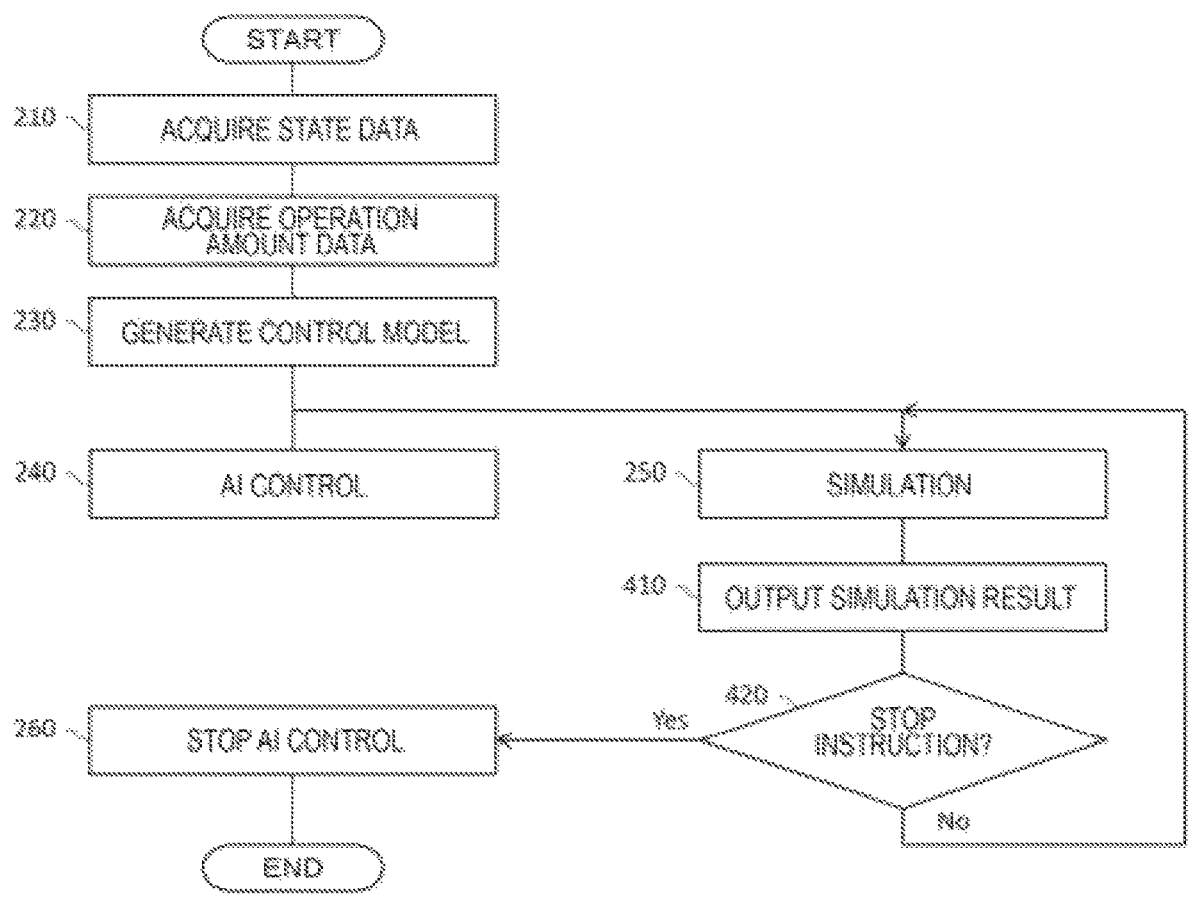
FIG. 4 shows an example of a flow where the control apparatus 100 according to the first modified embodiment of the present embodiment stops AI control.

FIG. 4 shows an example of a flow where the control apparatus 100 according to the first modified embodiment of the present embodiment stops AI control. In FIG. 4, the same processing as those in FIG. 2 is denoted with the same reference signs, and descriptions thereof are omitted, except differences to be described below. In the present flow, steps 410 and 420 are provided, instead of step 255.

In step 410, the control apparatus 100 outputs a simulation result. For example, the output unit 310 acquires a result of the simulation performed in step 250 by the simulation unit 150 and displays the simulation result on the monitor, thereby outputting the simulation result.

In step 420, the control apparatus 100 determines whether the stop of the AI control has been instructed. For example, the stop unit 160 determines whether an instruction to stop the AI control has been acquired from the operator or the like who has examined the simulation result, via the input unit 320. When an instruction to stop the AI control has not been acquired in step 420 (in a case of No), the control apparatus 100 returns the processing to step 250 and continues the flow. When an instruction to stop the AI control has been acquired in step 420 (in a case of Yes), the control apparatus 100 advances the processing to step 260. Then, the stop unit 160 notifies the control unit 140 that the AI control is to be stopped. In response to this, the control unit 140 is configured to stop the supply of the operation amount MV (AI) output by the control model 135 to the control target 20. In this way, the stop unit 160 stops the control of the control target 20 by the control model 135 when the stop unit acquires an instruction to stop the control in response to the output of the simulation result.

In this way, the control apparatus 100 according to the first modified embodiment outputs the simulation result, and stops the AI control, based on an instruction from the operator or the like who has examined the simulation result. Thereby, according to the control apparatus 100 of the first modified embodiment, it is possible to reflect an intention of the operator or the like when stopping the AI control.

Note that, in the above descriptions, the case where the control apparatus 100 executes steps 410 and 420 instead of step 255 has been shown as an example. However, the present invention is not limited thereto. The control apparatus 100 according to the first modified embodiment may execute steps 410 and 420, in addition to step 255. At this time, the control apparatus 100 may stop the AI control when either the stop instruction by the operator or the like or the automatic determination by a computer is satisfied. Instead of this, the control apparatus 100 may stop the AI control only when both the stop instruction by the operator and the automatic determination by the computer are satisfied. In this case, for example, when the control apparatus 100 outputs a simulation result indicating that an abnormality occurs in the equipment 10 to notify the operator or the like of an occurrence of the abnormality and acquires a stop instruction from the operator or the like in response to the notification, the control apparatus may stop the AI control. Thereby, according to the control apparatus 100 according to the first modified embodiment, the AI control can be stopped by using both automatic determination by the computer and manual determination by the operator.

Figure 5:
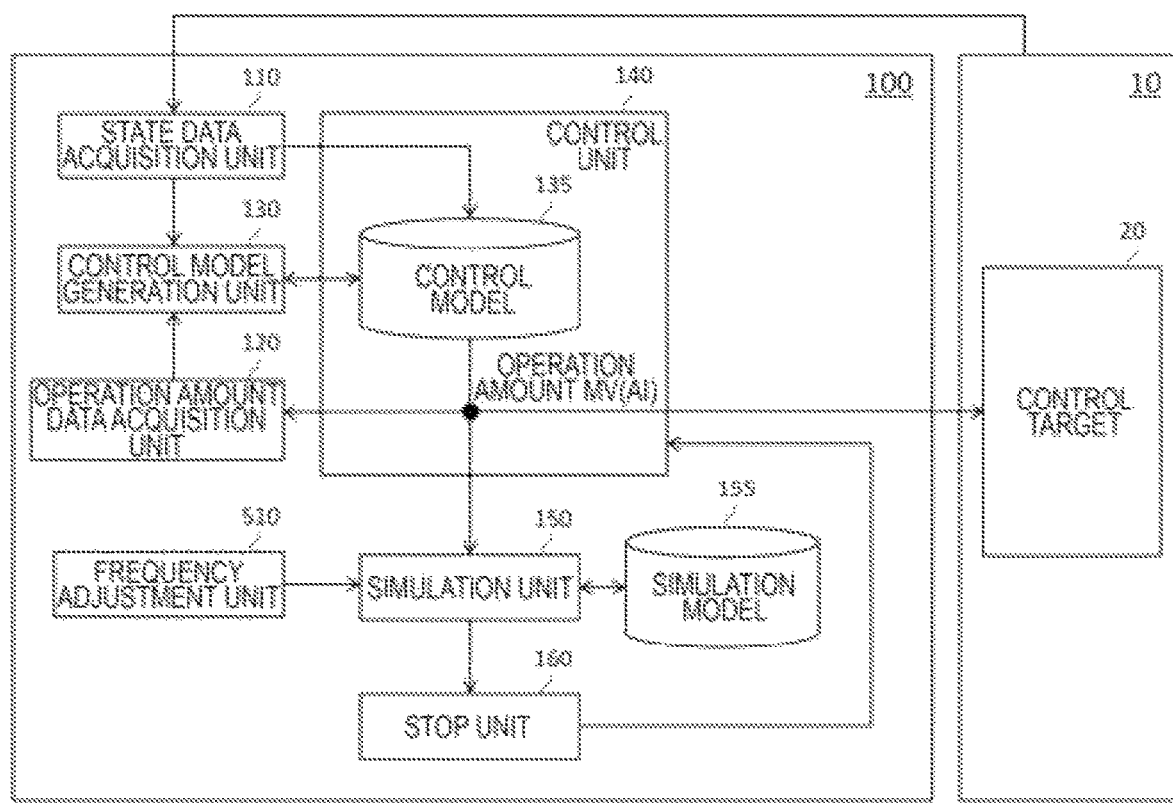
FIG. 5 shows an example of a block diagram of the control apparatus 100 according to a second modified embodiment of the present embodiment, together with the equipment 10 provided with the control target 20.

FIG. 5 shows an example of a block diagram of the control apparatus 100 according to a second modified embodiment of the present embodiment, together with the equipment 10 provided with the control target 20. In FIG. 5, the members having same functions and configurations as those in FIG. 1 are denoted with the same reference signs, and descriptions thereof are omitted, except differences to be described below. In the control apparatus 100 according to the above-described embodiment, the case where when the control model 135 outputs the operation amount MV (AI), the state of the equipment 10 in a case where the operation amount MV (AI) is given to the control target 20 is always simulated has been shown as an example. However, in the control apparatus 100 according to the second modified embodiment, a frequency of simulating the state of the equipment 10 is adjusted. The control apparatus 100 according to the second modified embodiment further comprises a frequency adjustment unit 510.

The frequency adjustment unit 510 is configured to trigger a simulation by the simulation unit 150. For example, the frequency adjustment unit 510 is configured to instruct the simulation unit 150 to simulate a state of the equipment 10 when a simulation timing has arrived. In response to this, the simulation unit 150 is configured to simulate a state of the equipment 10. At this time, the frequency adjustment unit 510 may be configured to be able to adjust a frequency of simulating a state of the equipment 10. For example, the frequency adjustment unit 510 may be configured to reduce the frequency of simulation as an elapsed time since the control of the control target 20 by the control model 135 is started becomes longer.

Figure 6:
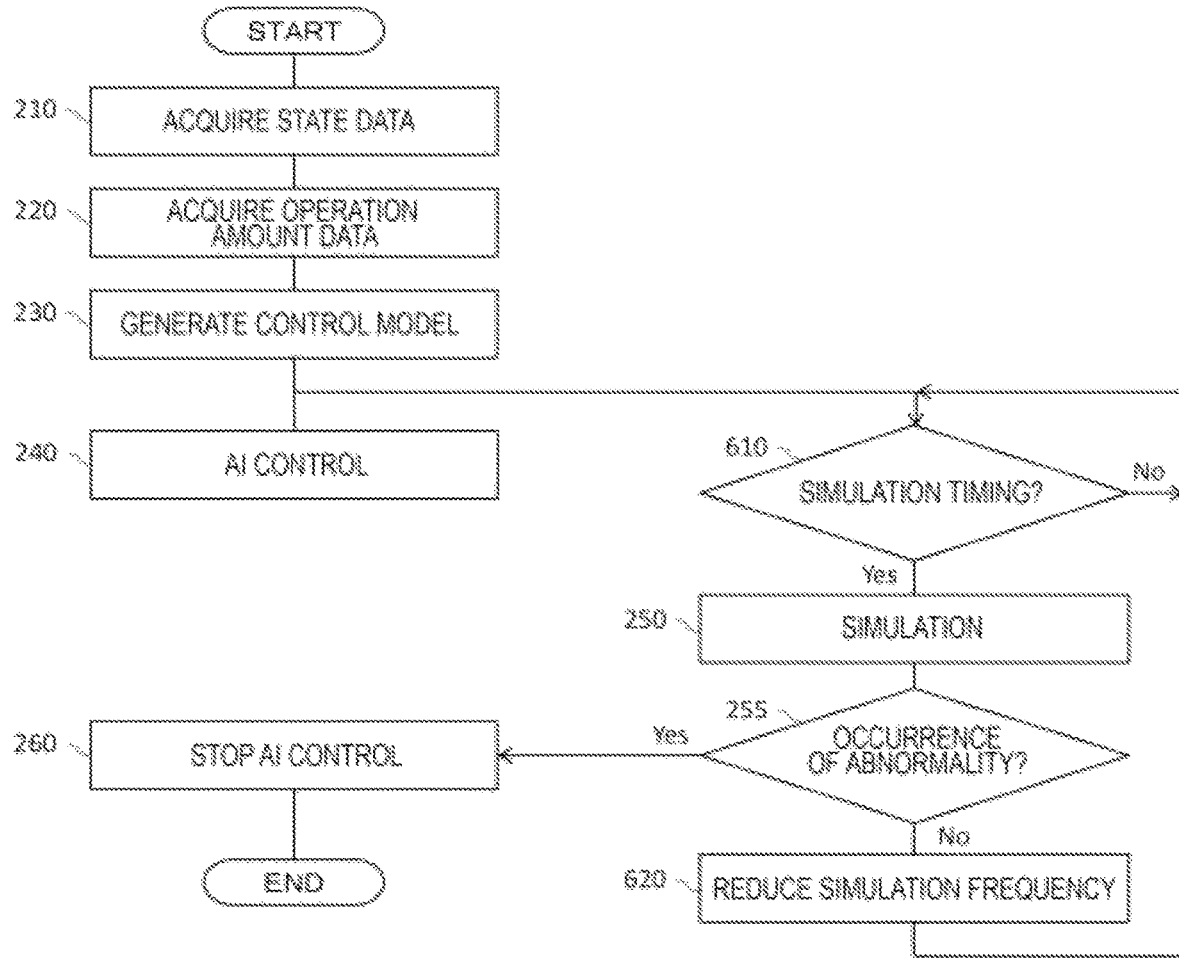
FIG. 6 shows an example of a flow where the control apparatus 100 according to the second modified embodiment of the present embodiment stops AI control.

FIG. 6 shows an example of a flow where the control apparatus 100 according to the second modified embodiment of the present embodiment stops AI control. In FIG. 6, the same processing as those in FIG. 2 is denoted with the same reference signs, and descriptions thereof are omitted, except differences to be described below. In the present flow, steps 610 and 620 are further provided.

In step 610, the control apparatus 100 (for example, the frequency adjustment unit 510) determines whether it is a simulation timing. Note that, an initial value of such simulation timing and an initial value of a simulation interval may be stored in advance. When it is determined in step 610 that it is not the simulation timing (in a case of No), the control apparatus 100 returns the processing to step 610 and continues the flow.

When it is determined in step 610 that it is the simulation timing (in a case of Yes), the control apparatus 100 triggers simulation by the simulation unit 150. For example, the frequency adjustment unit 510 is configured to instruct the simulation unit 150 to simulate a state of the equipment 10 when a simulation timing has arrived. In response to this, the simulation unit 150 simulates a state of the equipment 10 in step 250.

When the simulation result does not indicate occurrence of an abnormality in the equipment 10 in step 255 (in a case of No), the control apparatus 100 advances the processing to step 620.

In step 620, the control apparatus 100 reduces the simulation frequency. For example, the frequency adjustment unit 510 updates the simulation interval by adding a fixed length to the simulation interval stored in advance. That is, the frequency adjustment unit 510 reduces the frequency of simulation by extending an interval until a next simulation timing. In this way, when the elapsed time since the start of the AI control without stopping the AI control becomes longer, the frequency adjustment unit 510 determines that the AI control has become stable, and can reduce the simulation frequency. Then, the control apparatus 100 returns the processing to step 610 and continues the flow. In this way, in the control apparatus 100 according to the second modified embodiment, the frequency adjustment unit 510 may be configured to be able to adjust the frequency of simulating a state of the equipment 10. More specifically, the frequency adjustment unit 510 may be configured to reduce the frequency of simulation as the elapsed time since the control of the control target 20 by the control model 135 is started becomes longer.

The control apparatus 100 according to the second modified embodiment can adjust the frequency of simulating a state of the equipment 10. In particular, the control apparatus 100 according to the second modified embodiment is configured to reduce the frequency of simulation as the elapsed time since the AI control is started becomes longer. That is, the control apparatus 100 according to the second modified embodiment is configured to frequently execute the simulation immediately after the start of the AI control, and to reduce the frequency of executing the simulation as a long time elapses after the AI control is started. Thereby, according to the control apparatus 100 of the second modified embodiment, since the frequency of simulation can be adjusted depending on actual performance of the AI control, a processing load of the simulation in the control apparatus 100 can be reduced.

Figure 7:
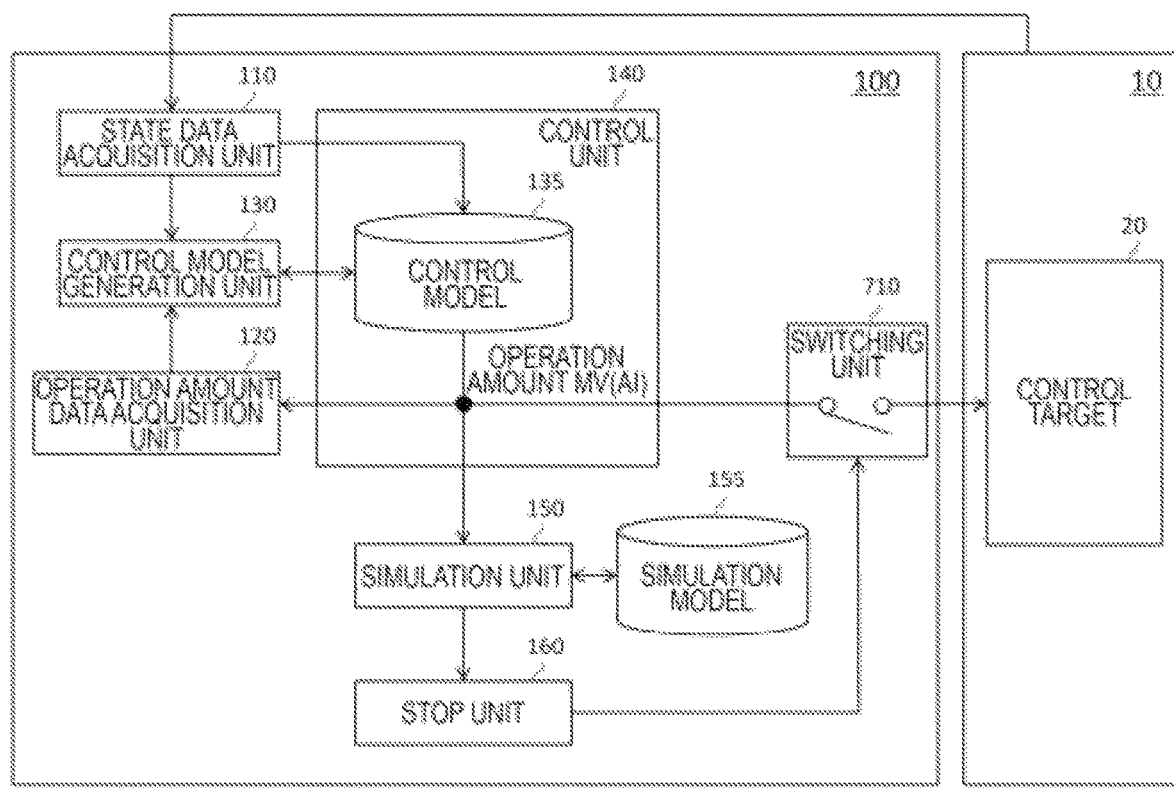
FIG. 7 shows an example of a block diagram of the control apparatus 100 according to a third modified embodiment of the present embodiment, together with the equipment 10 provided with the control target 20.

FIG. 7 shows an example of a block diagram of the control apparatus 100 according to a third modified embodiment of the present embodiment, together with the equipment 10 provided with the control target 20. In FIG. 7, the members having same functions and configurations as those in FIG. 1 are denoted with the same reference signs, and descriptions thereof are omitted, except differences to be described below. In the control apparatus 100 according to the above-described embodiment, the case where an output of the control unit 140 (i.e., an output of the control model 135) and the control target 20 are directly connected has been shown as an example. However, in the control apparatus 100 according to the third modified embodiment, it is possible to switch whether to input or shut off an output of the control model 135 with respect to the control target 20. The control apparatus 100 according to the third modified embodiment further comprises a switching unit 710.

The switching unit 710 has one end connected to an output of the control unit 140 (i.e., an output of the control model 135), and the other end connected to an input of the control target 20. The switching unit 710 is configured to switch whether to input or shut off the output of the control model 135 with respect to the control target 20. Such switching unit 710 may be configured by, for example, a switch configured to open and close an electric circuit, and in particular, may be configured by a physical switch configured to realize an open state of the electric circuit by a physical mechanism. In the control apparatus 100 according to the third modified embodiment, the stop unit 160 is configured to shut off the switching unit 710 when stopping the control of the control target 20 by the control model 135.

In this way, the control apparatus 100 according to the third modified embodiment can switch whether to input or shut off the output of the control model 135 with respect to the control target 20. Thereby, according to the control apparatus 100 of the third modified embodiment, it is possible to physically shut off the output of the control model 135 from being supplied to the control target 20 when stopping the AI control, and to prevent the output of the control model 135 from being erroneously input to the control target 20.

Figure 8:
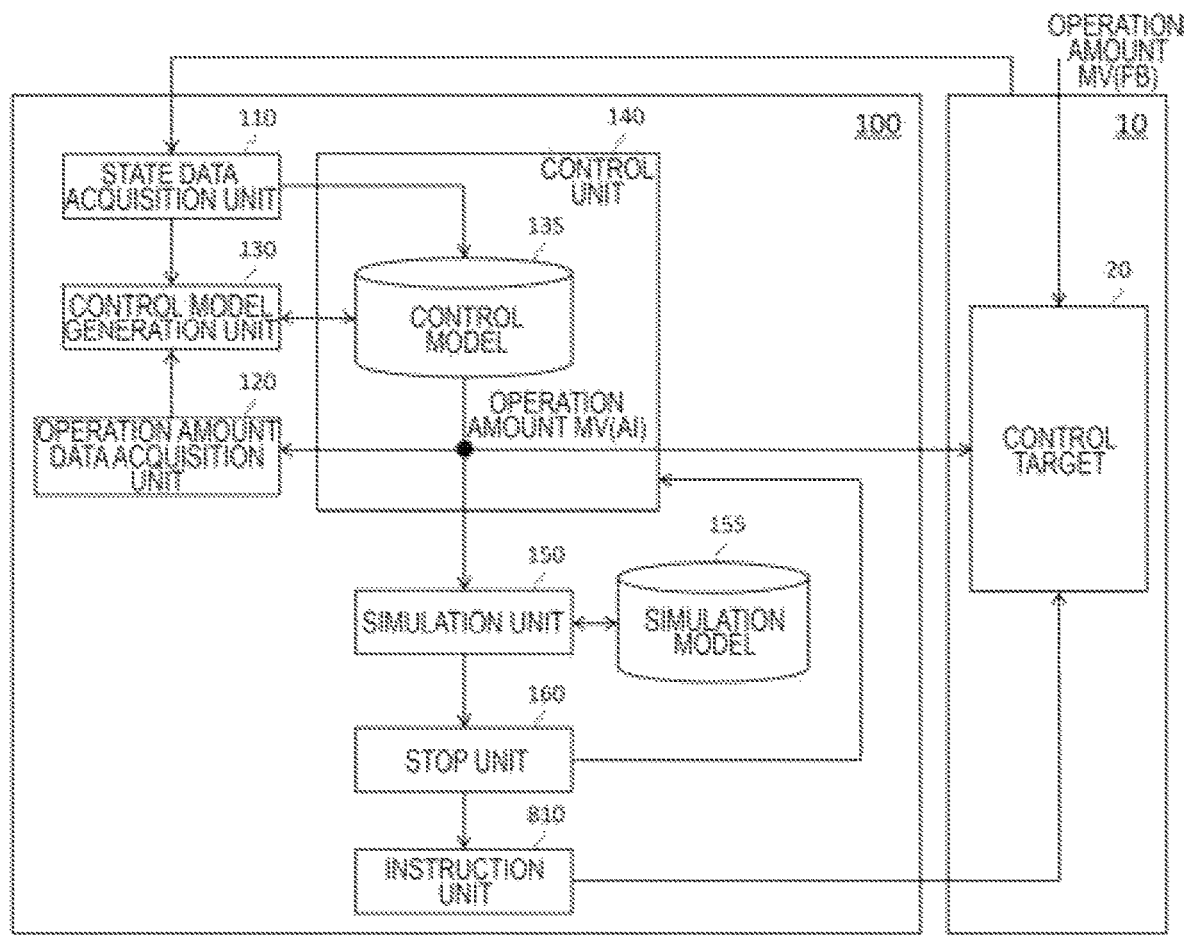
FIG. 8 shows an example of a block diagram of the control apparatus 100 according to a fourth modified embodiment of the present embodiment, together with the equipment 10 provided with the control target 20.

FIG. 8 shows an example of a block diagram of the control apparatus 100 according to a fourth modified embodiment of the present embodiment, together with the equipment 10 provided with the control target 20. In FIG. 8, the members having same functions and configurations as those in FIG. 1 are denoted with the same reference signs, and descriptions thereof are omitted, except differences to be described below. In the control apparatus 100 according to the above-described embodiment, the case where the AI control is simply stopped based on the simulation result has been shown as an example. However, in the control apparatus 100 according to the fourth modified embodiment, the control apparatus 100 is configured to instruct the control target 20 to switch to control by another control means when stopping the AI control. The control apparatus 100 according to the fourth modified embodiment further comprises an instruction unit 810.

In the fourth modified embodiment, it is assumed that the control target 20 can switch between feedback control by an operation amount MV (FB) given from a further controller (not shown) and AI control by an operation amount MV (AI) given from the control model.

In the control apparatus 100 according to the fourth modified embodiment, when stopping the AI control, the stop unit 160 is configured to notify the instruction unit 810 to that effect.

In response to this, the instruction unit 810 is configured to instruct the control target 20 to switch to control by another control means when stopping the control of the control target 20 by the control model 135. For example, when the control target 20 is capable of the feedback control, in addition to the AI control, the instruction unit 810 is configured to instruct the control target 20 to switch to the feedback control.

The control apparatus 100 according to the fourth modified embodiment is configured to instruct the control target 20 to switch to control by another control means when stopping the AI control. Thereby, according to the control apparatus 100 of the fourth modified embodiment, even when the AI control is stopped, the control of the control target 20 can be continued by another control means.

Various embodiments of the present invention may be described with reference to flowcharts and block diagrams whose blocks may represent (1) steps of processes in which operations are executed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. The dedicated circuitry may include a digital and/or analog hardware circuit, or may include an integrated circuit (IC) and/or a discrete circuit. The programmable circuitry may include a reconfigurable hardware circuit including logical AND, logical OR, logical XOR, logical NAND, logical NOR, and other logical operations, a memory element such as a flip-flop, a register, a field programmable gate array (FPGA) and a programmable logic array (PLA), and the like.

Computer-readable media may include any tangible device that can store instructions to be executed by a suitable device, and as a result, the computer-readable storage medium having the instructions stored thereon comprises an article of manufacture including instructions that can be executed to provide means for performing operations specified in the flowcharts or block diagrams. Examples of computer-readable media may include an electronic storage medium, a magnetic storage medium, an optical storage medium, an electromagnetic storage medium, a semiconductor storage medium, and the like. More specific examples of computer-readable media may include a floppy (registered trademark) disk, a diskette, a hard disk, a random access memory (RAM), a read-only memory (ROM), an erasable programmable read-only memory (EPROM or flash memory (registered trademark)), an electrically erasable programmable read-only memory (EEPROM), a static random access memory (SRAM), a compact disc read-only memory (CD-ROM), a digital versatile disk (DVD), a BLU-RAY (registered trademark) disk, a memory stick, an integrated circuit card, and the like.

Computer-readable instructions may include assembler instructions, instruction-set-architecture (ISA) instructions, machine instructions, machine dependent instructions, microcode, firmware instructions, state-setting data, or either source code or object code described in any combination of one or more programming languages, including an object oriented programming language such as Smalltalk (registered trademark), JAVA (registered trademark) and C++, and a conventional procedural programming language such as a 'C' programming language or similar programming languages.

Computer-readable instructions may be provided to a processor of a general purpose computer, a special purpose computer, or other programmable data processing apparatus, or to programmable circuitry, locally or via a local area network (LAN), wide area network (WAN) such as the Internet, etc., and the computer-readable instructions may be executed to provide means for performing operations specified in the flowcharts or block diagrams. Examples of processors include computer processors, processing units, microprocessors, digital signal processors, controllers, microcontrollers, and the like.

Figure 9:
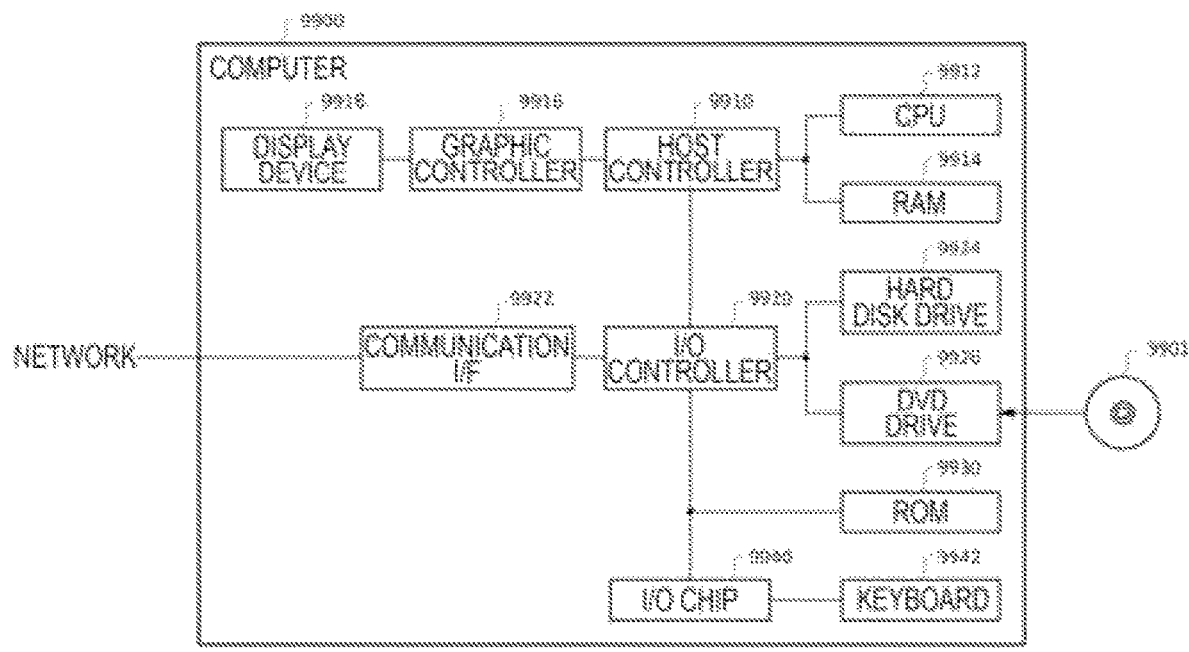
FIG. 9 shows an example of a computer 9900 in which a plurality of aspects of the present invention may be entirely or partially embodied.

FIG. 9 shows an example of a computer 9900 where a plurality of aspects of the present invention may be entirely or partially embodied. A program that is installed in the computer 9900 can cause the computer 9900 to function as or execute operations associated with the apparatus of the embodiment of the present invention or one or more sections of the apparatus, and/or cause the computer 9900 to execute the process of the embodiment of the present invention or steps thereof. Such a program may be executed by a CPU 9912 so as to cause the computer 9900 to execute a specific operation associated with some or all of the flowcharts and the blocks in the block diagrams described herein.

The computer 9900 according to the present embodiment includes the CPU 9912, a RAM 9914, a graphic controller 9916 and a display device 9918, which are mutually connected by a host controller 9910. The computer 9900 also includes input and output units such as a communication interface 9922, a hard disk drive 9924, a DVD drive 9926 and an IC card drive, which are connected to the host controller 9910 via an input and output controller 9920. The computer also includes legacy input and output units such as a ROM 9930 and a keyboard 9942, which are connected to the input and output controller 9920 via an input and output chip 9940.

The CPU 9912 is configured to operate according to programs stored in the ROM 9930 and the RAM 9914, thereby controlling each unit. The graphic controller 9916 is configured to acquire image data generated by the CPU 9912 on a frame buffer or the like provided in the RAM 9914 or in itself, and to cause the image data to be displayed on the display device 9918.

The communication interface 9922 is configured to communicate with other electronic devices via a network. The hard disk drive 9924 is configured to store programs and data that are used by the CPU 9912 within the computer 9900. The DVD drive 9926 is configured to read programs or data from a DVD-ROM 9901, and to provide the hard disk drive 9924 with the programs or data via the RAM 9914. The IC card drive is configured to read programs and data from an IC card, and/or to write programs and data into the IC card.

The ROM 9930 is configured to store therein a boot program or the like that is executed by the computer 9900 at the time of activation, and/or a program depending on the hardware of the computer 9900. The input and output chip 9940 may also be configured to connect various input and output units to the input and output controller 9920 via a parallel port, a serial port, a keyboard port, a mouse port and the like.

A program is provided by a computer-readable medium such as the DVD-ROM 9901 or the IC card. The program is read from the computer-readable medium, is installed into the hard disk drive 9924, the RAM 9914 or the ROM 9930, which are also examples of the computer-readable medium, and is executed by the CPU 9912. Information processing described in these programs is read into the computer 9900, resulting in cooperation between the programs and the various types of hardware resources described above. An apparatus or method may be constituted by realizing an operation or processing of information according to a use of the computer 9900.

For example, when communication is performed between the computer 9900 and an external device, the CPU 9912 may be configured to execute a communication program loaded onto the RAM 9914 to instruct the communication interface 9922 for communication processing, based on processing described in the communication program. The communication interface 9922 is configured, under control of the CPU 9912, to read transmission data stored on a transmission buffer processing area provided in a recording medium such as the RAM 9914, the hard disk drive 9924, the DVD-ROM 9901 or the IC card, and to transmit the read transmission data to a network or to write reception data received from the network to a reception buffer processing area or the like provided on the recording medium.

In addition, the CPU 9912 may be configured to cause all or a necessary portion of a file or a database, which has been stored in an external recording medium such as the hard disk drive 9924, the DVD drive 9926 (DVD-ROM 9901) and the IC card, to be read into the RAM 9914, thereby executing various types of processing on the data on the RAM 9914. Next, the CPU 9912 is configured to write the processed data back to the external recording medium.

Various types of information, such as various types of programs, data, tables, and databases, may be stored in the recording medium and may be subjected to information processing. The CPU 9912 may be configured to execute, on the data read from the RAM 9914, various types of processing including various types of operations, processing of information, conditional judgment, conditional branching, unconditional branching, search and replacement of information and the like described in the present disclosure and specified by instruction sequences of the programs, and to write a result back to the RAM 9914. In addition, the CPU 9912 may be configured to search for information in a file, a database, etc., in the recording medium. For example, when a plurality of entries, each having an attribute value of a first attribute associated with an attribute value of a second attribute, is stored in the recording medium, the CPU 9912 may be configured to search for an entry having a designated attribute value of the first attribute that matches a condition from the plurality of entries, and to read the attribute value of the second attribute stored in the entry, thereby acquiring the attribute value of the second attribute associated with the first attribute that satisfies a predetermined condition.

The programs or software modules described above may be stored in the computer-readable medium on the computer 9900 or near the computer 9900. In addition, a recording medium such as a hard disk or a RAM provided in a server system connected to a dedicated communication network or the Internet can be used as a computer-readable medium, thereby providing the programs to the computer 9900 via the network.

While the present invention has been described using the embodiments, the technical scope of the present invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the present invention.

The operations, procedures, steps, stages and the like of each process performed by an apparatus, system, program, and method shown in the claims, embodiments, or diagrams can be performed in any order as long as the order is not indicated by 'prior to,' before,' or the like and as long as the output from a previous process is not used in a later process. Even if the process flow is described using phrases such as 'first' or 'next' in the claims, embodiments, or diagrams, it does not necessarily mean that the process must be performed in this order.

EXPLANATION OF REFERENCES

10: equipment
20: control target
100: control apparatus
110: state data acquisition unit
120: operation amount data acquisition unit
130: control model generation unit
135: control model
140: control unit
150: simulation unit
155: simulation model
160: stop unit
310: output unit
320: input unit
510: frequency adjustment unit
710: switching unit
810: instruction unit
9900: computer
9901: DVD-ROM
9910: host controller
9912: CPU
9914: RAM
9916: graphic controller
9918: display device
9920: input and output controller
9922: communication interface
9924: hard disk drive
9926: DVD drive
9930: ROM
9940: input and output chip
9942: keyboard

What is claimed is:

1. A control apparatus comprising:
   a control unit configured to control a control target by a control model machine-learned so as to output an operation amount of the control target according to a state of equipment provided with the control target;
   a simulation unit configured to simulate, by using a simulation model, the state of the equipment in a case where the operation amount, which is output by the control model, is given to the control target;
   a stop unit configured to stop the control of the control target by the control model, based on a simulation result; and
   a frequency adjustment unit configured to adjust a frequency of simulating the state of the equipment;
   wherein
   the frequency adjustment unit is configured to reduce the frequency of simulation as an elapsed time since the control of the control target by the control model is started becomes longer.

2. The control apparatus according to claim 1, wherein the stop unit is configured to stop the control of the control target by the control model when the simulation result indicates occurrence of an abnormality in the equipment.

3. The control apparatus according to claim 2, further comprising an output unit configured to output the simulation result, wherein
   the stop unit is configured to stop the control of the control target by the control model when the stop unit acquires an instruction to stop the control in response to the output of the simulation result.

4. The control apparatus according to claim 2, further comprising a frequency adjustment unit configured to adjust a frequency of simulating the state of the equipment.

5. The control apparatus according to claim 2, further comprising a switching unit configured to switch whether to input or shut off an output by the control model with respect to the control target, wherein
the stop unit is configured to shut off the switching unit when stopping the control of the control target by the control model.

6. The control apparatus according to claim 2, further comprising an instruction unit configured to instruct the control target to switch to control by another control means when stopping the control of the control target by the control model.

7. The control apparatus according to claim 2, wherein
the simulation model is a simple model capable of simulating the state of the equipment in a shorter time than a time spent on an actual operation of the equipment.

8. The control apparatus according to claim 2, further comprising:
a state data acquisition unit configured to acquire state data indicative of the state of the equipment;
an operation amount data acquisition unit configured to acquire operation amount data indicative of the operation amount; and
a control model generation unit configured to generate the control model by machine learning by using the state data and the operation amount data.

9. The control apparatus according to claim 1, further comprising an output unit configured to output the simulation result, wherein
the stop unit is configured to stop the control of the control target by the control model when the stop unit acquires an instruction to stop the control in response to the output of the simulation result.

10. The control apparatus according to claim 9, further comprising a frequency adjustment unit configured to adjust a frequency of simulating the state of the equipment.

11. The control apparatus according to claim 1, further comprising a switching unit configured to switch whether to input or shut off an output by the control model with respect to the control target, wherein
the stop unit is configured to shut off the switching unit when stopping the control of the control target by the control model.

12. The control apparatus according to claim 11, wherein the switching unit is configured by a physical switch.

13. The control apparatus according to claim 1, further comprising an instruction unit configured to instruct the control target to switch to control by another control means when stopping the control of the control target by the control model.

14. The control apparatus according to claim 1, wherein
the simulation model is a simple model capable of simulating the state of the equipment in a shorter time than a time spent on an actual operation of the equipment.

15. The control apparatus according to claim 1, further comprising:
a state data acquisition unit configured to acquire state data indicative of the state of the equipment;
an operation amount data acquisition unit configured to acquire operation amount data indicative of the operation amount; and
a control model generation unit configured to generate the control model by machine learning by using the state data and the operation amount data.

16. The control apparatus according to claim 15, wherein
the control model generation unit is configured to generate the control model by performing reinforcement learning so that an operation amount whose reward value determined by a predetermined reward function is higher is output as a more recommended operation amount, in response to an input of the state data.

17. The control apparatus according to claim 1, wherein the frequency adjustment unit is configured to reduce the frequency of simulating the state of the equipment by extending an interval until a next simulation timing.

18. A control method comprising:
controlling a control target by a control model machine-learned so as to output an operation amount of the control target according to a state of equipment provided with the control target;
simulating, by using a simulation model, the state of the equipment in a case where the operation amount, which is output by the control model, is given to the control target;
stopping the control of the control target by the control model, based on a simulation result; and
adjusting a frequency of simulating the state of the equipment;
wherein
the adjusting the frequency includes reducing the frequency of the simulation as an elapsed time since the controlling of the control target by the control model is started becomes longer.

19. A non-transitory recording medium having recorded thereon a control program that, when executed by a computer, causes the computer to function as:
a control unit configured to control a control target by a control model machine-learned so as to output an operation amount of the control target according to a state of equipment provided with the control target;
a simulation unit configured to simulate, by using a simulation model, the state of the equipment in a case where the operation amount, which is output by the control model, is given to the control target;
a stop unit configured to stop the control of the control target by the control model, based on a simulation result; and
a frequency adjustment unit configured to adjust a frequency of simulating the state of the equipment;
wherein
the frequency adjustment unit is configured to reduce the frequency of simulation as an elapsed time since the control of the control target by the control model is started becomes longer.

* * * * *